UNITED STATES PATENT OFFICE.

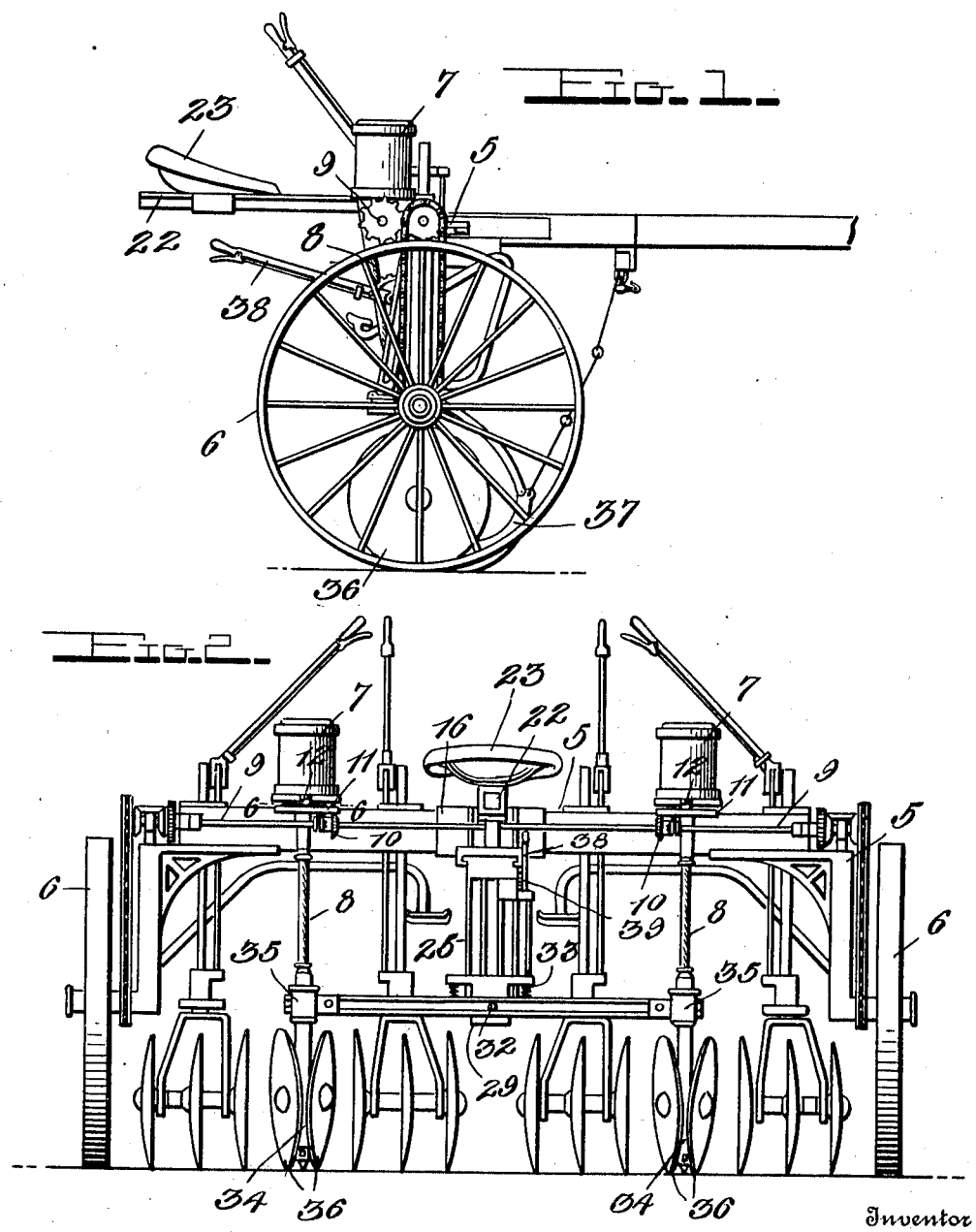

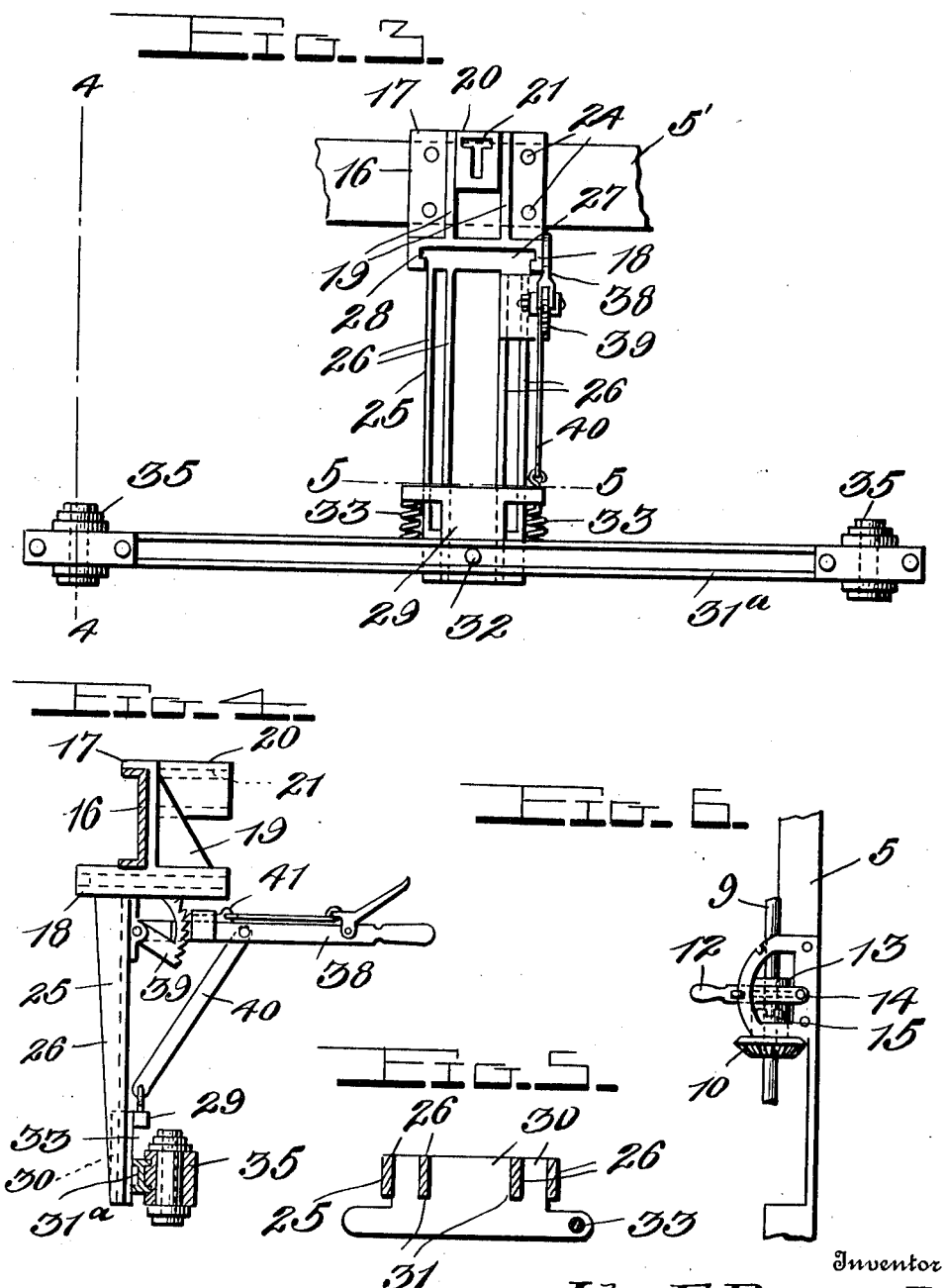

JOHN E. BINNS, JR., OF NASHVILLE, TENNESSEE.

SEED-PLANTER.

1,020,680. Specification of Letters Patent. Patented Mar. 19, 1912.

Original application filed April 10, 1911, Serial No. 620,065. Divided and this application filed April 15, 1911. Serial No. 621,431.

*To all whom it may concern:*

Be it known that I, JOHN E. BINNS, Jr., a citizen of the United States, residing at Nashville, in the county of Davidson and State of Tennessee, have invented certain new and useful Improvements in Seed-Planters, of which the following is a specification, reference being had to the accompanying drawings.

This invention relates to planting machines and has for its object to provide new and novel means for mounting and adjusting the seed depositing shoes whereby the seed may be planted at any desired depth; the present application being a division of my prior application for patent, Serial Number 620,065, filed April 10th, 1911.

Another object of the invention is to provide means for yieldingly supporting the shoes upon the frame of the machine so that they may be readily moved over obstructions and thereby avoid all liability of damage to the same.

With the above and other objects in view, the invention consists of the novel features of construction, combination and arrangement of parts hereinafter fully described and claimed, and illustrated in the accompanying drawings, in which—

Figure 1 is a side elevation of a seed planting machine embodying my improvements; Fig. 2 is a rear elevation thereof; Fig. 3 is an enlarged detail elevation of the shoe carrying frame; Fig. 4 is a section taken on the line 4—4 of Fig. 3; Fig. 5 is a section taken on the line 5—5 of Fig. 3; Fig. 6 is a detail section taken on the line 6—6 of Fig. 2.

The present invention relates to machines for planting seed in hills and for planting wheat and similar grain in drills, the invention relating more specifically to the mounting of the seed or grain depositing spouts. For the purpose of illustrating the application of my invention, I have shown in Figs. 1 and 2 of the drawings a double row seed planting machine for planting corn and similar seeds in hills, said machine also embodying a plurality of cultivator disk gangs, though it will be understood that this latter feature is not essential to the operation of the invention.

Referring now more particularly to the drawings, 5 designates a frame which may be of any ordinary or approved construction, and 6 the supporting wheels in which said frame is supported. Upon the frame 5 at opposite sides of its center, the seed hoppers 7 are arranged. Seed dropping mechanisms of any approved character are arranged within the hoppers 7 and are adapted to intermittently drop a number of seed into the conducting tubes 8 which convey the same to suitable depositing spouts as will be more fully hereinafter set forth. These seed dropping mechanisms are adapted to be simultaneously actuated through the medium of suitable gearing which is arranged on opposite ends of the frame 5 and are driven from the wheel axles to which said gearing is connected by means of suitable sprocket chains whereby rotary movement is transmitted to the seed dropping shaft 9.

The particular construction of the power transmission gearing whereby rotation is imparted to the shaft 9 is more fully set forth in a companion application Serial Number 621,432 filed coincident herewith. Upon the shaft 9, the miter gears 10 are loosely mounted which mesh with the gears 11 and drive the seed dropping mechanisms. Either or both of the seed dropping mechanisms may be thrown out of operation by means of the lever 12 see Fig. 6 which carries a depending yoke loosely engaged with a sliding clutch head 13 keyed upon the shaft 9. This lever is pivotally mounted upon a rack 14 secured to the frame 5 and carries the usual spring pressed holding dog for engagement with the teeth of the rack. A clutch head 15 is also carried by the pinion 10 with which the clutch member 13 is adapted to engage and lock the pinion on said shaft. In this manner it will be seen that by simply shifting the movable clutch member 13 on the shaft, the dropping mechanisms may be easily and quickly thrown out of operation.

To the center of the frame 5 a supporting member is rigidly secured. This supporting member consists of the body plate 16 formed upon its upper edge with a flange 17 for engagement over the upper edge of the angular frame bar. At its lower edge the body plate has formed thereon the forwardly and rearwardly extending guide flanges 18. These guide flanges are braced from the body plate by means of the webs 19 which are integrally formed therewith. Between these webs at the upper end of the plate 16 a lateral extension 20 is formed which is provided with a T-slot 21 to receive the seat bar 22 upon which the driver's seat 23 is mounted. This support is secured to the frame of the machine by means of a plurality of rivets or bolts 24 and the guides 18 thereof are adapted to receive a depending frame 25. This frame consists of the pairs of vertical parallel bars 26 which are spaced and integrally connected at their upper ends as at 27. Upon the upper end of this depending frame the longitudinal ribs 28 are formed for engagement in the guide flanges 18 of the support 16. A sliding block 29 is mounted upon the depending frame 25, and said block is provided upon its upper end with the laterally extending arms 30 which are grooved as at 31 to receive the parallel frame bars 26 (see Fig. 5). Upon the lower end of this sliding block 29, an eye beam 31ª is pivotally mounted intermediate of its ends as indicated at 32. This eye beam is transversely mounted in the frame and is normally held in parallel relation thereto by means of the coiled springs 33 which are arranged between the extensions or arms formed on the arms 30 of the sliding block, and the upper longitudinal edge of said beam. These springs will allow the eye beam to rock upon the sliding block so that the depositing spouts may safely pass over boulders, tree roots, or other obstructions without injury thereto. The depositing spouts 34 are mounted at their upper ends in suitable bearings 35 fixed to the ends of the beam 31ª, and said spout carries the usual inclined covering disks 36 which are adapted to cover the seed after it is deposited in the earth. Suitable furrow opening shoes 37 are also arranged at the ends of the eye beam 31ª and open a furrow in the movement of the machine into which the seed is deposited.

The rocking beam 31ª and parts carried thereby are adapted to be raised and lowered in order to regulate the depth to which the seed are planted, by means of a lever 38 pivotally mounted upon a rack segment 39. To this lever a link bar 40 is pivotally connected at one end, the other end of said bar being similarly connected to one of the arms 30 of the sliding block 29. The lever 38 carries the locking dog 41 for engagement with the teeth of the rack 39 to lock the sliding block 29 and the beam carried thereby in its adjusted position upon the depending frame 25. This lever is within convenient reach of the operator as will be noted from reference to Fig. 1 so that the shoes and depositing spouts may be easily and quickly adjusted in the frame of the machine. This adjusting means is comparatively simple, may be easily and quickly arranged upon machines of this character of the present construction, without requiring any material changes therein. It will also be evident that my improved adjusting means may be produced at comparatively small cost, and that the same is extremely efficient in practical use, for the purpose set forth.

From the foregoing it is believed that the construction and operation of the invention will be readily understood without requiring any additional description.

While I have specifically described the preferred construction and arrangement of the various parts, it will be obvious that the invention is susceptible of considerable modification without departing from the essential feature or sacrificing any of the advantages thereof.

Having thus described the invention what is claimed is:—

1. In a seed planter, a main frame and a seed hopper mounted thereon, a depending frame centrally secured to the main frame and having spaced guide-ways, a block movable in said guide-ways, a beam pivotally mounted upon said block for vertical oscillatory movement, means yieldingly holding said beam against movement, a seed depositing spout carried by the beam, a flexible connection between said spout and the seed hopper, and means mounted upon the depending frame and connected to said block for raising and lowering the same.

2. In a seed planter, a wheel supported frame and seed hoppers mounted thereon, a transversely disposed beam pivotally mounted in said frame for vertical sliding and oscillatory movement, seed depositing spouts carried by said beam, flexible connections between the spouts and the seed hoppers, and means for adjusting said beam vertically in the frame.

3. In a seed planter, a frame having seed hoppers arranged thereon, a block vertically slidable in said frame, a transversely disposed beam pivotally mounted intermediate of its ends upon said block, seed depositing spouts carried by said beam, flexible connections between said spouts and the seed hoppers, and manually operable means mounted on the frame and connected to said block to slide the same and vertically adjust the beam.

4. In a seed planter, a wheel supported frame having a seed hopper mounted thereon, a plate rigidly fixed to said frame, a depending frame having means formed thereon for interlocking engagement with corresponding means formed on said plate whereby said frame may be detachably connected to the plate, a vertically oscillatory beam bodily movable in a vertical plane upon said frame, a seed depositing spout carried by the beam, a flexible connection between said spout and the seed hopper, and means for raising and lowering the beam.

5. In a seed planter, a main frame having seed hoppers arranged thereon, a depending frame centrally secured to the main frame, a block mounted in said depending frame, a beam pivotally mounted on said block, means arranged between the beam and said block to yieldingly hold the beam against pivotal movement, seed depositing spouts carried by the beam, and flexible connections between said spouts and the seed hoppers.

6. In a seed planter, a wheel supported main frame having seed hoppers arranged thereon, a depending frame removably mounted upon the main frame, a block vertically slidable in the depending frame, a beam pivotally mounted on the block, means disposed between the beam and said block to yieldingly hold the beam against pivotal movement, seed depositing spouts carried by the beam, flexible connections between said spouts and the seed hoppers, and means mounted upon the depending frame and connected to said block to vertically adjust said beam upon the frame.

7. In a seed planter, a wheel supported frame having seed hoppers mounted thereon, a transversely disposed beam pivotally supported intermediate of its ends in said frame and having oscillatory movement in a vertical plane, seed depositing spouts arranged on each end of the beam, flexible connections between said spouts and the seed hoppers, means yieldingly holding said beam against oscillatory movement, and additional means for raising and lowering said beam.

8. In a seed planter, a main frame, guides rigidly fixed to said main frame, a depending frame removably engaged in said guides, said latter frame consisting of spaced pairs of parallel bars, a block having portions disposed between said parallel bars and vertically movable in said frame, depositing spouts mounted upon said block for movement independent thereof, means yieldingly holding said spouts against such independent movement, and means mounted upon said depending frame and connected to the block to vertically move the same and adjust the spouts with relation to the ground surface.

9. In a seed planter, a wheel supported frame having seed hoppers arranged thereon, a depending frame removably mounted centrally upon the main frame, a block vertically movable in said depending frame and having laterally extending arms, a transversely disposed beam pivotally mounted intermediate of its ends upon said block, springs arranged between the arms of the block and said beam to yieldingly maintain the beam against pivotal movement, seed depositing spouts arranged upon the ends of said beam, flexible connections between said spouts and the seed hoppers, a lever pivotally mounted upon said depending frame, and a link connecting said lever and said block to move the latter vertically in the frame and adjust the depositing spouts with relation to the ground surface.

In testimony whereof I hereunto affix my signature in the presence of two witnesses.

JOHN E. BINNS, Jr.

Witnesses:
D. W. BINNS,
R. A. RHODES.